(12) United States Patent
Lee et al.

(10) Patent No.: US 10,998,534 B2
(45) Date of Patent: May 4, 2021

(54) SECONDARY BATTERY

(71) Applicant: Samsung SDI Co., Ltd., Yongin-si (KR)

(72) Inventors: Hyun Soo Lee, Yongin-si (KR); Sang Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 133 days.

(21) Appl. No.: 16/351,419

(22) Filed: Mar. 12, 2019

(65) Prior Publication Data

US 2019/0296272 A1    Sep. 26, 2019

(30) Foreign Application Priority Data

Mar. 21, 2018    (KR) .................. 10-2018-0032808

(51) Int. Cl.
| | |
|---|---|
| *H01M 2/04* | (2006.01) |
| *H01M 2/26* | (2006.01) |
| *H01M 2/30* | (2006.01) |
| *H01M 2/34* | (2006.01) |
| *H01M 2/06* | (2006.01) |

(52) U.S. Cl.
CPC .............. *H01M 2/04* (2013.01); *H01M 2/06* (2013.01); *H01M 2/30* (2013.01); *H01M 2/348* (2013.01); *H01M 2200/103* (2013.01); *H01M 2200/20* (2013.01)

(58) Field of Classification Search
CPC ....... H01M 2200/103; H01M 2200/20; H01M 2/04; H01M 2/06; H01M 2/30; H01M 2/348; H01M 2/34; H01M 2/345
See application file for complete search history.

(56) References Cited

U.S. PATENT DOCUMENTS

| | | |
|---|---|---|
| 8,236,439 B2 | 8/2012 | Byun et al. |
| 9,054,371 B2 | 6/2015 | Guen |
| (Continued) | | |

FOREIGN PATENT DOCUMENTS

| | | |
|---|---|---|
| EP | 2595214 A1 | 5/2013 |
| EP | 3104431 A1 | 12/2016 |
| (Continued) | | |

OTHER PUBLICATIONS

EPO Extended Search Report dated Jun. 19, 2019, for corresponding European Patent Application No. 19163331.2 (7 pages).

*Primary Examiner* — Carlos Barcena
(74) *Attorney, Agent, or Firm* — Lewis Roca Rothgerber Christie LLP

(57) ABSTRACT

A secondary battery, which can improve reliability by allowing a membrane to be maintained in a short-circuited state until a preset current level is reached, includes an electrode assembly including a first electrode plate and a second electrode plate, a case accommodating the electrode assembly, a cap plate coupled to an opening of the case and electrically connected to the first electrode plate, an electrode terminal including a terminal plate passing through the cap plate and electrically connected to the second electrode plate, and an asymmetrically shaped inversion plate coupled to the cap plate and configured to perform an inversion operation when an internal pressure of the case exceeds a reference pressure.

15 Claims, 6 Drawing Sheets

(56) References Cited

U.S. PATENT DOCUMENTS

| | | | |
|---|---|---|---|
| 9,059,459 B2 * | 6/2015 | Byun | H01M 2/0404 |
| 9,246,140 B2 | 1/2016 | Kim et al. | |
| 10,008,710 B2 * | 6/2018 | Zhang | H01M 2/043 |
| 2010/0279156 A1 | 11/2010 | Kim et al. | |
| 2011/0039136 A1 | 2/2011 | Byun et al. | |
| 2013/0130072 A1 | 5/2013 | Guen | |
| 2016/0254519 A1 | 9/2016 | Lee et al. | |
| 2016/0301061 A1 * | 10/2016 | Urano | H01M 2/30 |
| 2016/0365547 A1 | 12/2016 | Li et al. | |
| 2017/0018758 A1 | 1/2017 | Sawada et al. | |
| 2019/0115568 A1 | 4/2019 | Li et al. | |
| 2019/0140252 A1 | 5/2019 | Guen | |

FOREIGN PATENT DOCUMENTS

| | | |
|---|---|---|
| EP | 3121873 A1 | 1/2017 |
| KR | 10-1093691 B1 | 12/2011 |
| KR | 10-1182284 B1 | 9/2012 |
| KR | 10-2016-0104381 A | 9/2016 |
| KR | 10-1683210 B1 | 12/2016 |
| WO | WO 2017/188533 A1 | 11/2017 |

\* cited by examiner

SECONDARY BATTERY

CROSS-REFERENCE TO RELATED APPLICATION

This application claims priority to and the benefit of Korean Patent Application No. 10-2018-0032808 filed on Mar. 21, 2018 in the Korean Intellectual Property Office, and all the benefits accruing therefrom under 35 U.S.C. 119, the contents of which in its entirety are herein incorporated by reference.

BACKGROUND

1. Field

The present disclosure relates to a secondary battery, which has an improved reliability by allowing a membrane to be maintained in a short-circuited state until a preset current level is reached.

2. Description of the Related Art

Unlike a primary battery that cannot be charged, a secondary battery may be recharged. A low-capacity secondary battery comprised of one single battery cell is used as the power source for various portable small-sized electronic devices, such as cellular phones, and camcorders. A high-capacity secondary battery in which several tens of battery cells are connected in a battery pack is used as the power source for motor drives, such as those in hybrid electric vehicles.

When the secondary battery is mounted in an electronic device or a vehicle, the secondary battery is exposed to a vibration or shock due to external circumstances (e.g., the environment). The vibration or shock repeatedly applied to the secondary battery may adversely affect internal components of the secondary battery, causing an operational failure of the secondary battery. Therefore, there is a need for a structure for dampening the vibration or shock applied to the secondary battery.

SUMMARY

Embodiments of the present disclosure provide a secondary battery, which has an improved reliability by allowing a membrane to be maintained at a short-circuited state until a preset current level is reached.

According to an aspect of the present disclosure, there is provided a secondary battery including an electrode assembly including a first electrode plate and a second electrode plate, a case accommodating the electrode assembly, a cap plate coupled to an opening of the case and electrically connected to the first electrode plate, an electrode terminal including a terminal plate passing through the cap plate and electrically connected to the second electrode plate, and an asymmetrically shaped inversion plate coupled to the cap plate. The asymmetrically shaped inversion plate is configured to perform an inversion operation when an internal pressure of the case exceeds a predetermined reference pressure.

The asymmetrically shaped inversion plate may a length that is larger than a width of the asymmetrically shaped inversion plate.

The length of the asymmetrically shaped inversion plate may extend in a lengthwise direction of the cap plate.

The asymmetrically shaped inversion plate may have an elliptical shape.

The asymmetrically shaped inversion plate may be configured to contact the terminal plate along a line-shaped contact region extending in a lengthwise direction of the terminal plate during an inversion operation.

The asymmetrically shaped inversion plate may be configured to contact the terminal plate at a circular contact region during an inversion operation.

The asymmetrically shaped inversion plate may include an edge portion coupled to a short-circuit hole of the cap plate, a round portion extending downwardly and convexly from the edge portion, and a protrusion portion upwardly protruding from a central region of the round portion, and the protrusion portion may have an asymmetrical planar shape.

The asymmetrically shaped inversion plate may have a shape including half circles combined with two facing opposite sides of a rectangle, respectively, in view of a plane of the protrusion portion.

The asymmetrically shaped inversion plate may be symmetric about an axis extending in a lengthwise direction of the asymmetrically shaped inversion plate and passing through a center asymmetrically shaped inversion plate.

The asymmetrically shaped inversion plate may be configured to contact the terminal plate along a contact region extending in the lengthwise direction and passing through a center of the protrusion portion.

A ratio of the length to the width of the asymmetrically shaped inversion plate is in a range from approximately 1:1.5 to approximately 1:2.5.

The asymmetrically shaped inversion plate may include a notch under the edge portion configured to facilitate the inversion operation.

The secondary battery may include a collector plate coupled to the terminal plate.

The collector plate may include a terminal connection part and a tab connection part.

The collector plate may include a fuse opening and a protection member covering the fuse opening.

As described above, the secondary battery according to one embodiment of the present disclosure includes an inversion plate having a roughly elliptical shape in which the width and length of the inversion plate are asymmetrical in view of a plane of the inversion plate, which increases a contact area between the inversion plate and a terminal plate during an inversion operation. Therefore, a short-circuit current transmitted during the inversion operation is allowed to flow for a longer period of time than in related art secondary batteries and until a fuse operation is performed, thereby improving the reliability of the fuse operation.

DETAILED DESCRIPTION

Hereinafter, an embodiment of the present disclosure will be described in detail. Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

Figure 1:
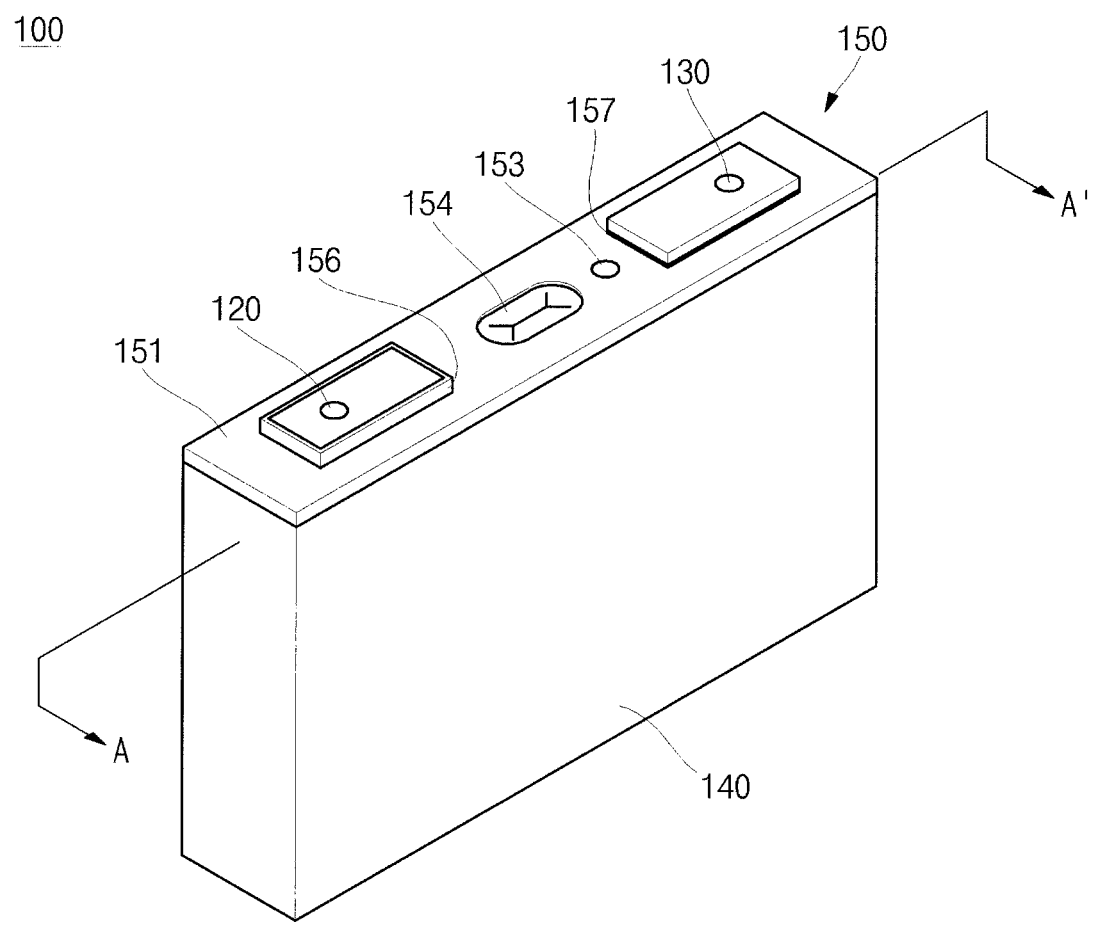
FIG. 1 is a perspective view of a secondary battery according to an embodiment of the present disclosure.
Figure 2:
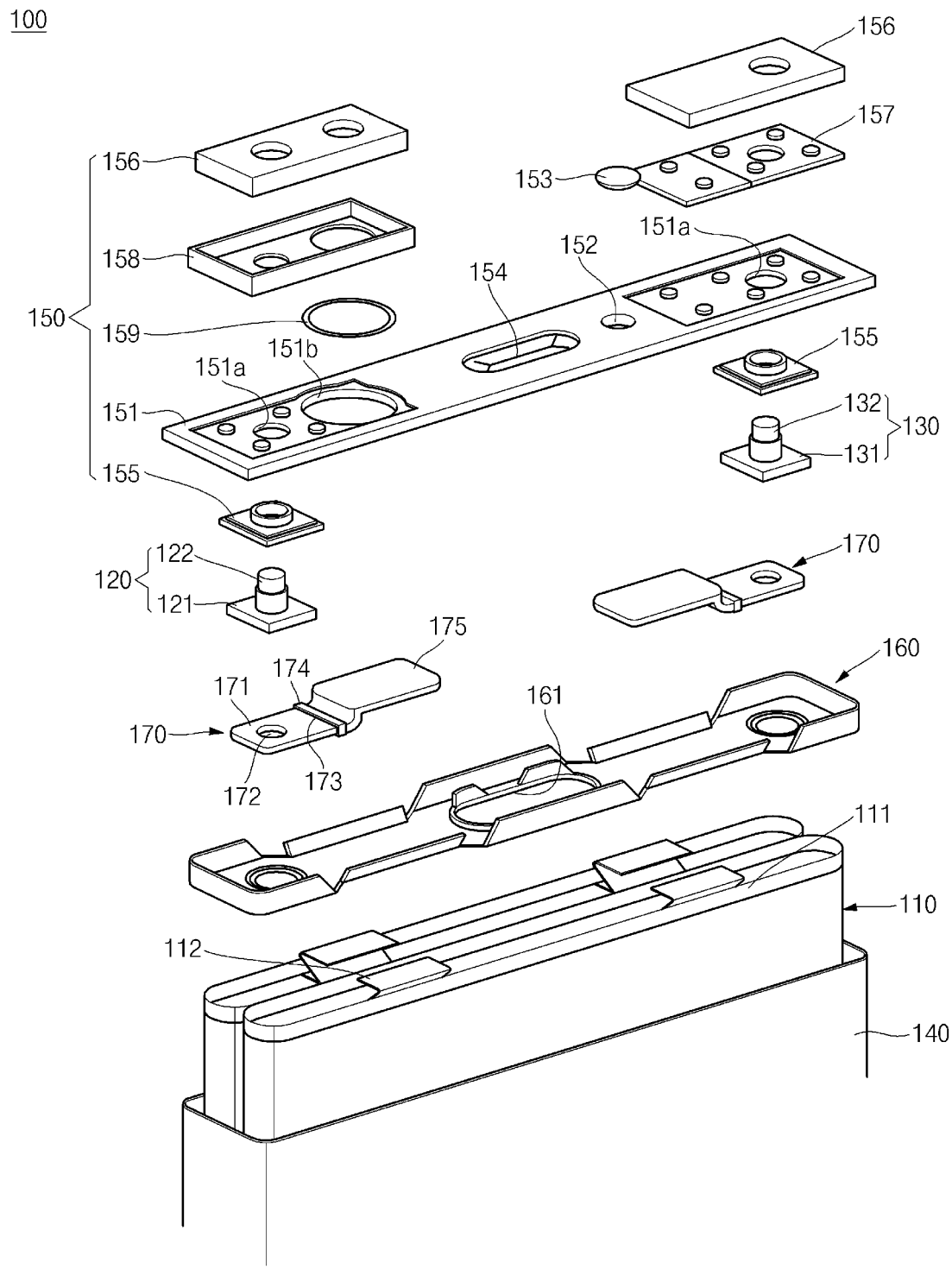
FIG. 2 is an exploded perspective view of the secondary battery according to an embodiment of the present disclosure.
Figure 3:
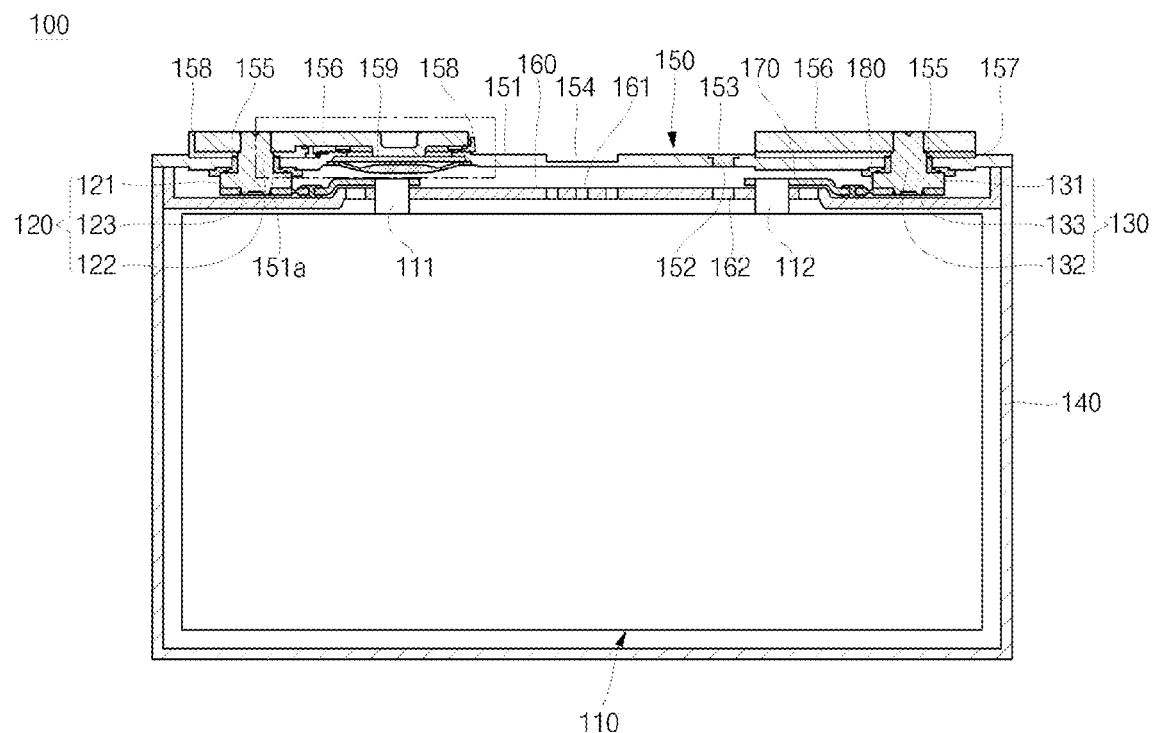
FIG. 3 a cross-sectional view of the secondary battery according to an embodiment of the present disclosure.
Figure 4:
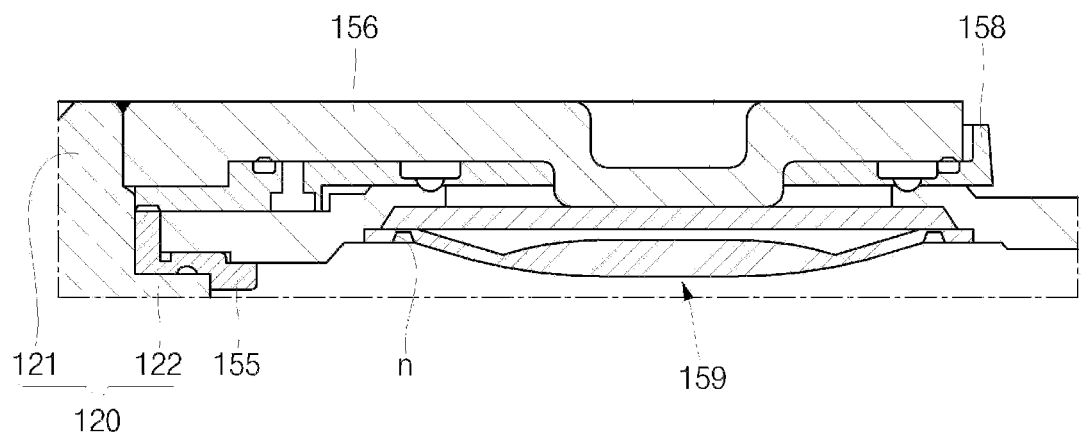
FIG. 4 is an enlarged cross-sectional view illustrating a connection relationship between a terminal plate and an inversion plate in the secondary battery according to an embodiment of the present disclosure.
Figure 5:
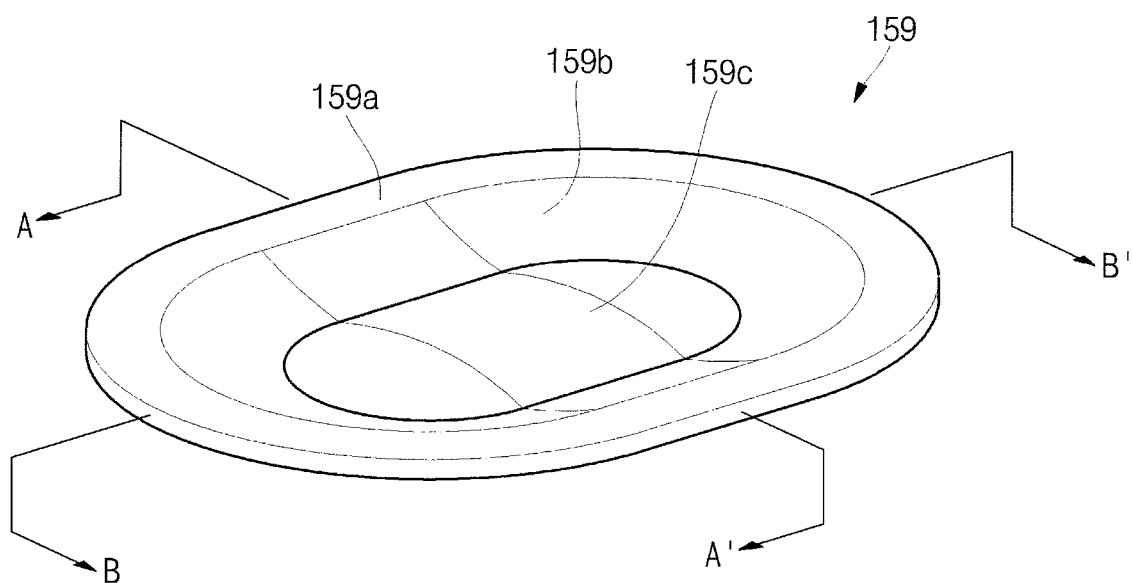
FIG. 5 is a perspective view illustrating the inversion plate of the secondary battery according to an embodiment of the present disclosure.
Figure 6A:
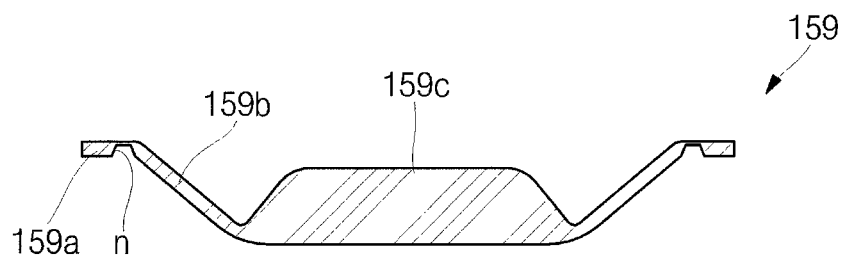
FIG. 6A is a cross-sectional view of FIG. 5 taken along the line A-A' and FIG. 6B is a cross-sectional view of FIG. 5 taken along the line B-B'.
Figure 6B:
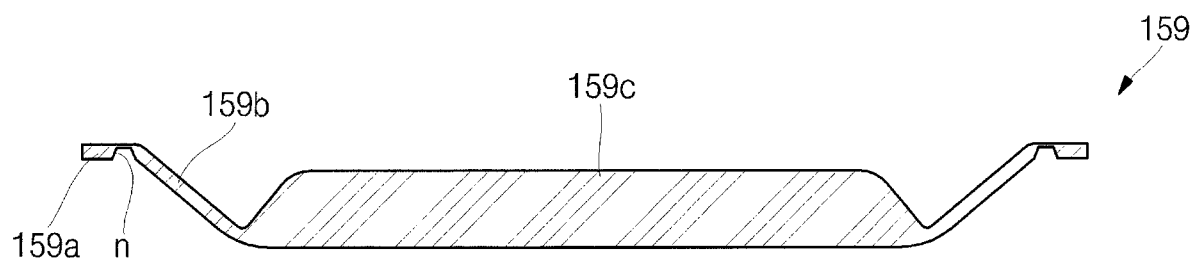
Figure 7:
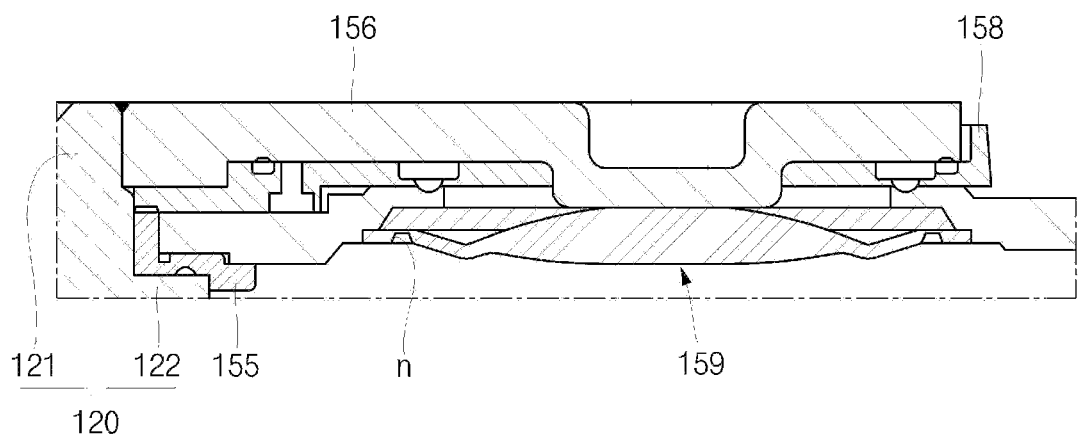
FIG. 7 is a cross-sectional view illustrating a state after the inversion plate is inverted in the secondary battery according to an embodiment of the present disclosure.
Figure 8:
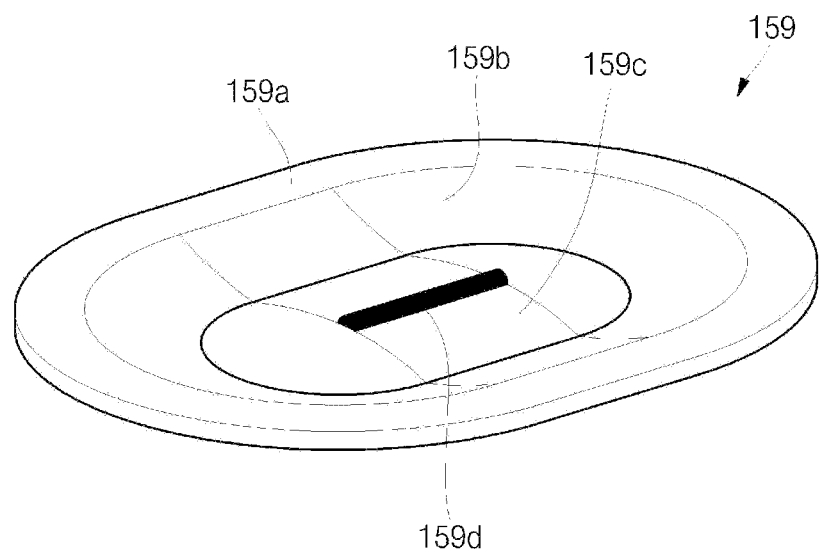
FIG. 8 is a perspective view illustrating a contact region between the inversion plate and a terminal plate according to the operation of the inversion plate illustrated in FIG. 7.

FIG. 1 is a perspective view of a secondary battery according to an embodiment of the present disclosure. FIG. 2 is an exploded perspective view of a secondary battery according to an embodiment of the present disclosure. FIG. 3 a cross-sectional view of a secondary battery according to an embodiment of the present disclosure. FIG. 4 is an enlarged cross-sectional view illustrating a connection relationship between a terminal plate and an inversion plate in the secondary battery according to an embodiment of the present disclosure. FIG. 5 is a perspective view illustrating the inversion plate of the secondary battery according to an embodiment of the present disclosure. FIG. 6A is a cross-sectional view of FIG. 5 taken along the line A-A' and FIG. 6B is a cross-sectional view of FIG. 5 taken along the line B-B'. FIG. 7 is a cross-sectional view illustrating a state after the inversion plate is inverted in the secondary battery according to an embodiment of the present disclosure. FIG. 8 is a perspective view illustrating a contact region between the inversion plate and a terminal plate according to the operation of the inversion plate illustrated in FIG. 7.

Referring to FIGS. 1 to 6B, a secondary battery 100 according to an embodiment of the present disclosure includes an electrode assembly 110, electrode terminals 120 and 130, a case 140, a cap assembly 150, an insulation plate 160, and at least one collector plate 170.

The electrode assembly 110 may be formed by winding or stacking a stack structure of a first electrode plate, a separator, and a second electrode plate, which are formed of thin plates or layers. The first electrode plate may serve as a negative electrode and the second electrode plate may serve as a positive electrode. In one or more embodiments, polarities of the first electrode plate and the second electrode plate may be reversed.

The first electrode plate may be formed by coating a first electrode active material, such as graphite or carbon, on a first electrode collector plate formed of a metal foil made of copper or nickel. The first electrode plate may include a first electrode uncoated portion where the first electrode active material is not coated. The first electrode uncoated portion may function as a passage for current flowing between the first electrode plate and an exterior of the first electrode plate. The material of the first electrode plate is not limited to those materials disclosed herein.

In addition, the first electrode uncoated portion may form a first current collecting tab 111. The first current collecting tab 111 may include a plurality of first current collecting tabs, which are formed to protrude from the first electrode uncoated portion. The plurality of first current collecting tabs 111 may overlap each other at each predetermined position at the time of winding the first electrode plate, thereby forming a multi-tab structure. To this end, the first electrode plate may be wound in a state in which the plurality of first current collecting tabs 111 are disposed to be spaced a preset distance apart from each other. Since the first current collecting tabs 111 are integrally formed with the first electrode plates and are drawn from the respective wound first electrode plates, current collecting efficiency of the electrode assembly 110 can be advantageously increased. Optionally, the first current collecting tab 111 can also be formed separately from the first electrode plate as desired by one skilled in the art.

The second electrode plate may be formed by coating a second electrode active material, such as a transition metal, on a second electrode collector plate formed of a metal foil made of aluminum. The second electrode plate may include a second electrode uncoated portion where the second electrode active material is not coated.

In addition, the second electrode uncoated portion may form a second current collecting tab 112 corresponding to the first current collecting tab 111. Like the first current collecting tab 111, the second current collecting tab 112 may also be formed by winding the second electrode plate in a state in which a plurality of second current collecting tabs are disposed in the second electrode plate to be spaced apart from each other. Therefore, like the first current collecting tab 111, the second current collecting tab 112 may also form a multi-tab structure.

The separator may be positioned between the first electrode plate and the second electrode plate to prevent electrical short circuits and to allow movement of lithium ions. The separator may be made, for example, of polyethylene, polypropylene, or a composite film of polypropylene and polyethylene. The material of the separator is not limited to those materials disclosed herein.

The electrode assembly 110 may be accommodated in the case 140 with an electrolytic solution. The electrolytic solution may include a lithium salt, such as, $LiPF_6$ or $LiBF_4$, dissolved in an organic solvent, such as ethylene carbonate (EC), propylene carbonate (PC), diethyl carbonate (DEC), ethyl methyl carbonate (EMC), or dimethyl carbonate (DMC). In addition, the electrolytic solution may be in a liquid, a solid or a gel phase. The first current collecting tab 111 and the second current collecting tab 112 may be electrically connected to the collector plate 170.

The electrode terminals 120 and 130 are electrically connected to the first current collecting tab 111 and the second current collecting tab 112 of the electrode assembly 110, respectively. The electrode terminals 120 and 130 include a first electrode terminal 120 electrically connected to the first current collecting tab 111 and a second electrode terminal 130 electrically connected to the second current collecting tab 112. In the illustrated embodiment, the first current collecting tab 111 and the second current collecting tab 112 are electrically connected to the respective collector plate 170. Therefore, the first and second electrode terminals 120 and 130 may be coupled to the respective collector plate 170 to then be electrically connected to the first and second current collecting tabs 111 and 112, respectively. In addition, the first and second current collecting tabs 111 and 112 may be coupled to the respective collector plate 170 by, for example, ultrasonic welding, resistance welding or laser welding, but not limited thereto.

The first electrode terminal 120 may include a body part 121 and a terminal part 122 vertically protruding from the body part 121. The terminal part 122 may penetrate the cap plate 151 of the cap assembly 150, and an upper portion thereof may be riveted and fixed to the cap plate 151. The body part 121 may be provided under the terminal part 122 and may have a larger area than the terminal part 122. In addition, a coupling protrusion 123 to be coupled to the collector plate 170 may be formed on a bottom surface of the body part 121. The coupling protrusion 123 is engaged with a through-hole of the collector plate 170 to electrically connect the first electrode terminal 120 and the collector plate 170.

In addition, the second electrode terminal 130 may also include a body part 131, a terminal part 132 and a coupling protrusion 133 so as to correspond to the first electrode terminal 120. Since the shape of the second electrode terminal 130 is the same with that of the first electrode terminal 120, a detailed description will not be provided.

The case 140 may be made of a conductive metal, e.g., aluminum, aluminum alloy, or nickel plated steel. The case 140 may have an approximately hexahedral shape with an opening to receive and mount the electrode assembly 110. The cap plate 151 is coupled to the opening of the case 140 to seal the case 140. The internal surface of the case 140 is insulated, thereby preventing an electrical short circuit from occurring in the case 140. In some embodiments, one electrode of the electrode assembly 110 may be electrically connected to the case 140 through the cap plate 151. In this instance, the case 140 may function as a positive electrode.

In one or more embodiments, the cap assembly 150 is coupled to a top portion (e.g., an opening in the top portion) of the case 140. In one or more embodiments, the cap assembly 150 includes a cap plate 151, an electrolyte injection hole 152, a plug 153, a safety vent 154, a gasket 155, a terminal plate 156, a connection member 157, an insulation member 158, and an inversion plate 159.

The cap plate 151 may be shaped of a plate and may be coupled to the opening of the case 140. The cap plate 151 may be formed of the same material as the case 140. The cap plate 151 may be coupled to the opening of the case 140 by laser welding. In addition, the cap plate 151 may be electrically isolated from, or may be electrically connected to, one of the first current collecting tab 111 or the second current collecting tab 112. For example, the cap plate 151 may be electrically connected to the second current collecting tab 112. In one embodiment, the cap plate 151 and the case 140 may have the same polarity (e.g., the polarity of a positive electrode). In one or more embodiments, the cap plate 151 may also be electrically connected to the first current collecting tab 111.

In addition, an electrolyte injection hole 152 for injecting an electrolyte solution is formed at one side of the cap plate 151. During manufacturing, the electrolyte solution is injected into the case 140 through the electrolyte injection hole 152 and the electrolyte injection hole 152 is then sealed by a plug 153.

In addition, the safety vent 154 having a smaller thickness than other regions of the cap plate 151 is formed roughly at the center of the cap plate 151. When an internal pressure of the case 140 exceeds a preset rupture pressure, the safety vent 154 may be ruptured, thereby preventing the secondary battery 100 from exploding.

In addition, terminal holes 151a allowing the first and second electrode terminals 120 and 130 to penetrate may be formed at opposite sides of the cap plate 151, and the gasket 155 may be provided at each of the terminal holes 151a. The gaskets 155 may be made of an insulating material and may be coupled to the cap plate 151 from below to then seal spaces between each of the first and second electrode terminals 120 and 130 and the cap plate 151. The gaskets 155 may prevent external moisture from being introduced into the secondary battery 100, and/or may prevent leakage of electrolyte solution from the secondary battery 100.

One of the terminal plates 156 may be coupled to each of the first and second electrode terminals 120 and 130 upwardly protruding from the cap plate 151 through the terminal holes 151a of the cap plate 151. In addition, after the terminal plates 156 are coupled to the first and second electrode terminals 120 and 130, top portions of the first and second electrode terminals 120 and 130 may be riveted or welded, thereby fixing the first and second electrode terminals 120 and 130 to the terminal plates 156.

The connection member 157 may be positioned between the terminal plate 156 coupled to the second electrode terminal 130 and the cap plate 151, thereby electrically connecting the second electrode terminal 130 and the cap plate 151. The connection member 157 may make close contact with the cap plate 151 and the gasket 155 through the terminal plate 156.

The insulation member 158 may be positioned between the terminal plate 156 coupled to the first electrode terminal 120 and the cap plate 151 to insulate the first electrode terminal 120 and the cap plate 151 from each other. The insulation member 158 may make close contact with the cap plate 151 and the gasket 155 through the terminal plate 156.

The inversion plate 159 may be formed in a short-circuit hole 151b formed at one side of the cap plate 151. In one embodiment, the short-circuit hole 151b may be formed in the vicinity of (e.g., proximate to) the terminal 151a coupled to the first electrode terminal 120. The inversion plate 159 may be positioned between the insulation member 158 and the cap plate 151 in the short-circuit hole 151b. The inversion plate 159 and the cap plate 151 may have the same polarity. When an internal pressure of the case 140 exceeds a preset reference pressure, the inversion plate 159 may be inverted (e.g., protruding upwardly and convexly) to make contact with the terminal plate 156 coupled to the first electrode terminal 120, thereby inducing a short-circuit.

In one embodiment, a hole corresponding to the short-circuit hole 151b is formed in the insulation member 158. In the embodiment illustrated in FIGS. 5, 6A, and 6B, the inversion plate 159 includes an edge portion 159a fixed to the cap plate 151 and a round portion 159b extending downwardly and convexly from the edge portion 159a. A notch n may be formed under the edge portion 159a to facilitate an inversion operation of the inversion plate 159.

In one embodiment, the inversion plate 159 may also include a protrusion portion 159c upwardly protruding along the thickness direction of the inversion plate 159 at a central region of the round portion 159b of the inversion plate 159.

In one embodiment, the protrusion portion 159c may be formed to have a roughly or generally elliptical shape in which the width and length of the protrusion portion 159c are asymmetrical in a plane of the protrusion portion 159c. In one embodiment, in the plane of the protrusion portion 159c, the protrusion portion 159c may be configured to have a shape including half circles combined with two facing opposite sides of a rectangle, respectively. With this configuration, which will later be described, a line contact between the protrusion portion 159c and the terminal plate 156 can be easily induced through a line-shaped contact region extending in the lengthwise direction of the protrusion portion 159c, thereby increasing a contact area between the protrusion portion 159c and the terminal plate 156 compared to a related art secondary battery in which the contact region is a point.

Referring to FIGS. 5 to 6B, the inversion plate 159 may be formed such that a length along the line B-B' is larger than a width along the line A-A'. In one embodiment, the widthwise direction of the inversion plate 159 may coincide with the widthwise direction of the cap plate 151, and the lengthwise direction of the inversion plate 159 may coincide with the lengthwise direction of the cap plate 151. Therefore, the length of the inversion plate 159, which is larger than the width due to less restriction in space, may extend in the lengthwise direction of the cap plate 151, thereby allowing the inversion plate 159 to be formed in a roughly elliptical shape. In addition, in a case where the inversion plate 159 is brought into contact with the terminal plate 156 during the inversion operation, it may contact the terminal plate 156 at a region extending in the lengthwise direction, thereby allowing the inversion plate 159 to be maintained at a short-circuited state.

In more detail, when the inversion plate 159 is inverted to make contact with the terminal plate 156, as illustrated in FIG. 7, it contacts the terminal plate 156 on or at a contact region 159d of the inversion plate 159 having a line shape extending in the lengthwise direction of the inversion plate 159 and passing through the center of the inversion plate 159, as illustrated in FIG. 8. An area of the contact region 159d between the inversion plate 159 and the terminal plate 156 can be increased, compared to a related art secondary battery in which a contact region is generally shaped of a point. In addition, since a short-circuit current flows through the increased contact area, the flow of the short-circuit current may be maintained for a constant period of time. In addition, while the short-circuit current is being applied, a fuse operation may be performed through a fuse opening (e.g., hole) 173 formed in the collector plate 170, which will later be described, thereby increasing the reliability of the fuse operation.

In addition, a ratio of the length to the width of the inversion plate 159 may range from 1:1.5 to 1:2.5. When the length of the inversion plate 159 is more than 1.5 times the width thereof, a line contact can be easily induced during the inversion operation of the inversion plate 159. In addition, when the length of the inversion plate 159 is less than 2.5 times the width thereof, the inversion operation of the inversion plate 159, which is induced by an increased internal pressure, may be performed without restriction, thereby increasing the reliability of the inversion operation.

The insulation plate 160 may be positioned between the cap plate 151 and the electrode assembly 110. The insulation plate 160 may protect the electrode assembly 110 and particularly may prevent the electrode assembly 110 from being damaged when the cap plate 151 is inwardly deformed. In addition, the insulation plate 160 may fix a position of the electrode assembly 110 inside the case 140. In addition, although not illustrated, the insulation plate 160 may be coupled to the case 140 such that an edge of the insulation plate 160 is suspended on the opening of the case 140. In addition, the insulation plate 160 may be coupled to the case 140 with an interference fit.

A vent hole 161 is formed the insulation plate 160 at a position corresponding to the safety vent 154, and an injection hole 162 is formed at a position corresponding to the electrolyte injection hole 152. In one or more embodiments, the vent hole 161 may include one or more holes, but the present disclosure is not limited thereto. Internal gases generated from the case 140 may reach the safety vent 154 of the cap plate 151 through the vent hole 161, and the safety vent 154 may be ruptured at a preset rupture pressure to then release the internal gases.

The insulation plate 160 may be made of a general insulting material, such as polypropylene or polyethylene, but the material of the insulation plate 160 is not limited to those materials disclosed herein.

The collector plate 170 may be provided as a pair of collector plates 170 on the insulation plate 160. The pair of collector plates 170 may be connected to the first current collecting tab 111 and the second current collecting tab 112 of the electrode assembly 110, respectively. In one embodiment, the first current collecting tab 111 and the second current collecting tab 112 protrude from side portions of the insulation plate 160 and are bent to surround opposite sides of the collector plate 170. In this state, the collector plate 170 may be coupled to each of the first current collecting tab 111 and the second current collecting tab 112 by, for example, welding. The pair of collector plates 170 may be electrically connected to the first current collecting tab 111 and the second current collecting tab 112, respectively, and the collector plates 170 may have the same polarity as the current collecting tab 111 or 112 to which it is electrically connected. For example, the collector plate 170 electrically connected to the first current collecting tab 111 may have a negative polarity, and the collector plate 170 electrically connected to the second current collecting tab 112 may have a positive polarity.

The collector plates 170 may include a terminal connection part 171 coupled to a respective one of the first and second electrode terminals 120 and 130 and a tab connection part 175 coupled to a respective one of the first and second current collecting tabs 111 and 112.

A through-hole 172 engaged with a respective one of the coupling protrusions 123 and 133 of the first and second electrode terminals 120 and 130 may be formed at one side of the terminal connection part 171. That is, each of the coupling protrusions 123 and 133 of the first and second electrode terminals 120 and 130 may be engaged with the through-hole 172 of one of the collector plates 170, thereby electrically connecting the collector plates 170 to the respective ones of first electrode terminal 120 and the second electrode terminal 130. In addition, the fuse opening 173 may be formed at the other side of the terminal connection part 171. The fuse opening hole 173 may be formed at a portion of the terminal connection part 171, which is adjacent with the tab connection part 175. The fuse opening 173 may be shaped of, for example, a rectangle elongated in the direction perpendicular to the lengthwise direction of the terminal connection part 171, but the shape of the fuse opening 173 is not limited to that shape disclosed herein. The fuse opening 173 may be configured to reduce a cross-sectional area of the terminal connection part 171. When a large amount of current flows in the secondary battery 100 due to occurrence of a short circuit, heat may be generated in the secondary battery 100 and a region where the fuse opening 173 is formed may be melted and broken by the generated heat, thereby cutting of the flow of current. In addition, a protection member 174 may be formed in the fuse opening 173. The protection member 174 may be formed to cover the fuse opening 173. In one embodiment, the protection member 174 may cover top, bottom and side surfaces of the terminal connection part 171 having the fuse opening 173. The protection member 174 may also be formed inside the fuse opening 173. The protection member 174 may function to prevent an arc from being generated when the region where the fuse opening 173 is formed is melt and broken. In addition, the protection member 174 may function to reinforce a mechanical strength of the terminal connection part 171 having the fuse opening 173. The protection member 174 may be made of an insulting material, such as polypropylene or polyethylene, but the material of the protection member 174 is not limited to those materials disclosed herein.

The tab connection part 175 may extend from the terminal connection part 171 toward the center of the cap plate 151. The tab connection part 175 may be formed at a higher position than the terminal connection part 171. Therefore, there may be a step difference between the terminal connection part 171 and the tab connection part 175. The inversion plate 159 may be positioned on the tab connection part 175 of one of the collector plates 170. The first and second current collecting tabs 111 and 112 may each be electrically coupled to the tab connection part 175 of a respective one of the collector plates 170. In one embodiment, the first and second current collecting tabs 111 and 112 protruding from the side portions of the insulation plate 160 may be bent to surround opposite sides of the tab connection part 175 to then be coupled to the tab connection part 175 of the respective collector plate 170 by welding.

As described above, the secondary battery 100 according to an embodiment of the present disclosure includes the inversion plate 159 having a roughly or generally elliptical shape in which the width and length of the inversion plate 159 are asymmetrical in view of a plane of the inversion plate 159, which increases a contact area between the inversion plate 159 and the terminal plate 156 during an inversion operation of the inversion plate 159. Therefore, a short-circuit current transmitted during the inversion operation is allowed to flow for longer period of time than in related art secondary batteries and until a fuse operation is performed, thereby securing the reliability of the fuse operation.

Hereinafter, a configuration of a secondary battery according to another embodiment of the present disclosure will be described.

Figure 9:
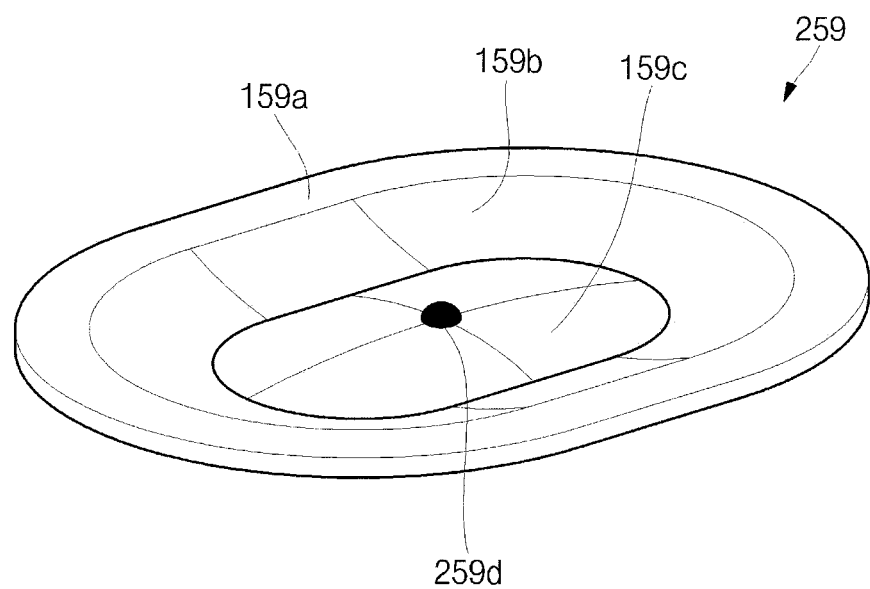
FIG. 9 is a perspective view illustrating a contact region between an inversion plate and a short-circuit plate when the inversion plate is inverted in a secondary battery according to another embodiment of the present disclosure.

FIG. 9 is a perspective view illustrating a contact region between an inversion plate and a short-circuit plate when the inversion plate is inverted in a secondary battery according to another embodiment of the present disclosure. The same functional elements as those of the previous embodiment will be denoted by the same reference numerals and the following description will focus on differences between the previous embodiment and the current embodiment.

Referring to FIG. 9, in the secondary battery according to another embodiment of the present disclosure, an inversion plate 259 may be formed to have a smaller length than the inversion plate 159 of the previous embodiment. Therefore, in the current embodiment, a contact region 259d may be shaped of a circle, unlike in the previous embodiment in which the contact region 159d is shaped of a line. Nevertheless, since the inversion plate 259 still has an elliptical shape in which the length of the inversion plate 259 is larger than the width, an area of the contact region 259d can be increased, compared to a general point-shaped contact region. Therefore, during an inversion operation of the inversion plate 259, the inversion plate 259 may be maintained at a state in which it contacts the terminal plate 159, thereby improving the operational reliability.

While the secondary battery according to the present disclosure has been particularly shown and described with reference to an exemplary embodiment thereof, it will be understood by those of ordinary skill in the art that various changes in form and details may be made therein without departing from the spirit and scope of the present invention as defined by the following claims.

EXPLANATION OF REFERENCE NUMERALS

| | |
|---|---|
| 100: Secondary battery | 110: Electrode assembly |
| 111: First current collecting tab | 112: Second current collecting tab |
| 120: First electrode terminal | 130: Second electrode terminal |
| 140: Case | 150: Cap assembly |
| 151: Cap plate | 152: Electrolyte injection hole |
| 153: Plug | 154: Safety vent |
| 155: Gasket | 156: Terminal plate |
| 157: Connection member | 158: Insulation member |
| 159: Inversion plate | 160: Insulation plate |
| 159a: Edge portion | 159b: Round portion |
| 159c: Protrusion portion | 159d, 259d: Contact region |
| 170: Collector plate | 171: Terminal connection part |
| 172: Through-hole | 173: Fuse opening |
| 174: Protection member | 175: Tab connection part |

What is claimed is:

1. A secondary battery comprising:
an electrode assembly including a first electrode plate and a second electrode plate;
a case accommodating the electrode assembly;
a cap plate coupled to an opening of the case and electrically connected to the first electrode plate;
an electrode terminal including a terminal plate passing through the cap plate and electrically connected to the second electrode plate; and
an asymmetrically shaped inversion plate coupled to the cap plate, the asymmetrically shaped inversion plate configured to perform an inversion operation when an internal pressure of the case exceeds a predetermined reference pressure,
wherein the asymmetrically shaped inversion plate comprises a protrusion portion upwardly protruding away from the electrode assembly, and
wherein the protrusion portion has an asymmetrical planar shape, the asymmetrical planar shape having a length that is larger than a width of the asymmetrical planar shape.

2. The secondary battery of claim 1, wherein the asymmetrically shaped inversion plate has a length that is larger than a width of the asymmetrically shaped inversion plate.

3. The secondary battery of claim 2, wherein the length of the asymmetrically shaped inversion plate extends in a lengthwise direction of the cap plate.

4. The secondary battery of claim 1, wherein the asymmetrically shaped inversion plate has an elliptical shape.

5. The secondary battery of claim 1, wherein, during an inversion operation, the asymmetrically shaped inversion plate is configured to contact the terminal plate along a line-shaped contact region extending in a lengthwise direction of the terminal plate.

6. The secondary battery of claim 1, wherein, during an inversion operation, the asymmetrically shaped inversion plate is configured to contact the terminal plate at a circular contact region.

7. The secondary battery of claim 1, wherein the asymmetrically shaped inversion plate further comprises:
- an edge portion coupled to a short-circuit hole of the cap plate; and
- a round portion extending downwardly and convexly from the edge portion,
- wherein the protrusion portion protrudes upwardly from a central region of the round portion.

8. The secondary battery of claim 7, wherein the asymmetrically shaped inversion plate has a shape comprising half circles combined with two facing opposite sides of a rectangle, respectively, in view of a plane of the protrusion portion.

9. The secondary battery of claim 8, wherein the asymmetrically shaped inversion plate is symmetric about an axis extending in a lengthwise direction of the asymmetrically shaped inversion plate and passing through a center of the asymmetrically shaped inversion plate.

10. The secondary battery of claim 8, wherein, during an inversion operation, the asymmetrically shaped inversion plate is configured to contact the terminal plate along a contact region of the asymmetrically shaped inversion plate extending in the lengthwise direction and passing through a center of the protrusion portion.

11. The secondary battery of claim 7, wherein the asymmetrically shaped inversion plate further comprises a notch under the edge portion configured to facilitate the inversion operation.

12. The secondary battery of claim 1, wherein a ratio of a length to a width of the asymmetrically shaped inversion plate is in a range from approximately 1:1.5 to approximately 1:2.5.

13. The secondary battery of claim 1, further comprising a collector plate coupled to the terminal plate.

14. The secondary battery of claim 13, wherein the collector plate comprises a terminal connection part and a tab connection part.

15. The secondary battery of claim 14, wherein the collector plate further comprises:
- a fuse opening; and
- a protection member covering the fuse opening.

* * * * *